(12) United States Patent
Hochheiser et al.

(10) Patent No.: US 7,153,895 B2
(45) Date of Patent: Dec. 26, 2006

(54) BLENDING OF RUBBER COMPOUNDS, FILLERS AND PLASTICIZERS

(75) Inventors: Joseph M. Hochheiser, Southbury, CT (US); Emmanuel G. Kontos, Trumbull, CT (US); Richard W. Tomlinson, Watertown, CT (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 303 days.

(21) Appl. No.: 09/951,018

(22) Filed: Sep. 12, 2001

(65) Prior Publication Data

US 2003/0130404 A1    Jul. 10, 2003

(51) Int. Cl.
*C08J 3/22* (2006.01)
*C08K 3/04* (2006.01)
*C08K 3/10* (2006.01)
*C08K 3/36* (2006.01)
*C08K 5/10* (2006.01)

(52) U.S. Cl. ............... 523/351; 524/286; 524/296; 524/425; 524/448; 524/451; 524/493; 524/495; 524/496; 524/763

(58) Field of Classification Search .......... 523/351; 524/496, 495, 493, 448, 451, 425, 763, 296, 524/286
See application file for complete search history.

(56) References Cited

U.S. PATENT DOCUMENTS 4,599,370 A    7/1986   Grossman et al.
5,153,076 A * 10/1992  Jadamus et al. ............ 428/521
5,302,635 A    4/1994   Brinkmann et al.
6,365,663 B1 * 4/2002   Mabry et al. ............... 524/495
6,620,363 B1 * 9/2003   Farris et al. ............ 264/211.12

FOREIGN PATENT DOCUMENTS

| EP | 0 100 434 A2 | 2/1984 |
| GB | 1 507 691 | 5/1975 |
| GB | 1 551 382 | 7/1976 |
| WO | WO 00/26279 A1 | 5/2000 |

OTHER PUBLICATIONS

Schiesser, W., "Tyre Mixing Needs Re-Appraisal", *European Rubber Journal*, Oct. 1992, pp. 26-27.
Johnson, F., "Rubbercon 92: A Vision for Europe", *Francis Shaw & Company Limited*, Jun. 1992, 7 pages.
Harmon, A., Literature Search, Jun. 7, 2001.

* cited by examiner

*Primary Examiner*—Tae H Yoon
(74) *Attorney, Agent, or Firm*—Michael P. Dilworth

(57) ABSTRACT

Disclosed are methods for the formation of a rubber/filler/curative/plasticizer compacted masterbatch which may be performed in two ways. In one embodiment, a rubber and a filler are intimately mixed for a time and under shear conditions sufficient to form a free flowing associated composition, then the composition is mixed with a plasticizer and a curative to form the compacted masterbatch. Alternatively, the starting material may be an already-formed free flowing associated composition of rubber, filler and optional curative, which is mixed with a plasticizer and optional curative to form the compacted masterbatch.

39 Claims, No Drawings

BLENDING OF RUBBER COMPOUNDS, FILLERS AND PLASTICIZERS

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to the blending of rubbers, fillers, curatives and plasticizers to form a masterbatch compacted compound.

2. Description of the Related Art

It is highly desirable to form masterbatch compacted compounds containing rubber, fillers, plasticizers and curatives, especially in a single mixing step.

PCT publication WO 00/26279 is directed to the formation of a free flowing polymer/filer masterbatch powder. That material is useful in the present invention, but a compacted masterbatch is not taught.

European Patent Application 0100434 A2 is directed to the formation of rubber powders in which the rubber is first subdivided in a pre-cutting step into segments having a maximum particle size of less than about 20 cm, then the cut segments are mixed with an anti-tack agent. Again, compacted masterbatches are not taught.

BRIEF SUMMARY OF THE INVENTION

In one aspect, the present invention relates to a method for the formation of a rubber/filler compacted masterbatch compound, which method comprises a) introducing into a mixing vessel a rubber, a filler and optionally a curative;

b) intimately mixing said polymer, filler and optional curative for a time and under shear conditions sufficient to convert the components into a free flowing associated composition of rubber, filler and optional curative;

c) adding a plasticizer and optionally a curative to said associated composition in said mixing vessel; and d) mixing said plasticizer, optional curative and said associated composition for a time sufficient to form a compacted masterbatch compound; wherein a curative is added during at least one of steps a) and c).

In another aspect, the present invention relates to a method for the formation of a rubber/filler masterbatch compound, which method comprises a) introducing into a mixing vessel i) a free flowing associated composition of a rubber, a filler and optionally a curative; and ii), a plasticizer and optionally a curative, wherein a curative is added to the vessel in this step; and b) mixing said plasticizer, curative and said associated composition for a time sufficient to form a compacted masterbatch compound.

In another aspect, the present invention relates to the products of the methods set forth above.

In yet another aspect, the present invention relates to a molded, calendered or extruded article made from the products set forth above.

DETAILED DESCRIPTION OF THE INVENTION

The present invention provides a means for forming a blend of a rubber, a curative, a filler and a plasticizer. In one embodiment, the rubber, filler and an optional curative are mixed to form a free-flowing powder, then the plasticizer and an optional curative are added, with the proviso that the final product should contain a curative. Alternatively, the present invention contemplates the use of a free-flowing rubber/filler powder or a free-flowing rubber/filler/curative powder as a starting material, to which a plasticizer and curative are added which, after mixing, results in the compacted masterbatch compound.

Suitable rubbers include both natural rubber and synthetic rubbers, and combinations thereof. Synthetic rubbers include, but are not limited to, for example, ethylene/alpha-olefin/non-conjugated polyene (EPDM) rubbers, ethylene/alpha-olefin (EPR) rubbers, styrene/butadiene rubbers, acrylonitrile/butadiene (NBR) rubbers, polychloroprene rubbers, polybutadiene rubbers, isobutylene-isoprene copolymers, etc. The rubber component also includes mixtures of two or more different materials. In a preferred embodiment, the rubber material, prior to blending, is substantially or completely free of filler material. In another embodiment, the rubber may contain a relatively small amount of filler (e.g., up to about 50 phr) prior to the addition of filler in accordance with the present invention.

Suitable fillers include any filler conventionally used in rubber compounding, including carbon black, hydrated amorphous silica, fumed silica, diatomaceous earth, talc, calcium carbonate, etc., and may include mixtures of two or more different fillers.

Suitable plasticizers are well known and include paraffinic, aromatic, or naphthenic extender oils; polar plasticizers such as monomeric phthalates, e.g., dioctyl phthalate, DINB, DIDP, or DBP; monomeric adipates or sebacates; and polyester adipates or sebacates; and mixtures of any of the foregoing. The level of the plasticizer(s) may be from about 10 to about 160 parts per hundred of rubber.

Suitable curatives are well known and include N-cyclohexyl-2-benzothiazole sulfenamide; N-t-butyl-2-benzothiazole sulfenamide; 2-(morpholinothio)benzothiazole; 2-mercaptobenzothiazole; tetraethylthiuram disulfide; tetramethylthiuram monosulfide; tetramethylthiuram disulfide; zinc dimethyldithio carbamate; diphenyl guanidine; sulfur; insoluble sulfur; 4,4' dithiodimorpholine; dipentamethylene thiuram tetrasulfide; dicumyl peroxide; 2,2'-bis (tert-butylperoxy)diisopropyl benzene; and p-quinone dioxime. It will be understood that as used herein, curative includes mixtures one or more curatives, as well as curative packages known in the art.

The compounds according to the present invention may have a weight ratio of rubber to filler from about 1:0.15 to about 1:10, preferably from about 1:0.15 to about 1:1.5, depending on the constituent materials and the application therefor.

It is preferred that the compounds resulting from the present invention be in a solid form, i.e., is a non-powdery compacted mass which is ready for further processing (via extrusion, etc.)

The masterbatch compounds of the present invention may be processed by well known means into, e.g., various types of end product molded, calendered or extruded articles, including tires, hoses, roof sheeting, weatherstripping, belts, wire and cable covers, etc., and may contain other conventional additives such as processing aids, antioxidants, antiozonants, etc.

In one embodiment, the compounds of the present invention may be formed by subjecting the desired amounts of polymer and filler, preferably in a substantially dry state, to shear conditions in an internal mixer such as Brabenders, continuous screw extruders, Banburys, etc. and for a time sufficient to form a free-flowing associated composition of rubber and filler. For present purposes, a dry state is defined as substantially free from polymerization medium solvents, plasticizers and/or water. In a preferred embodiment, the rubber and filler are blended in a mixer, preferably for about 1 to about 5 minutes to form a powder. The plasticizer and curative may then be added, and the resulting material is mixed for an additional period of time sufficient to achieve the desired level of mixing. While the process has been described in terms of two mixing steps, it will be understood that given suitable mixing equipment, the plasticizer and curative may be added to the rubber/filler powder while the latter is still being mixed.

In a preferred embodiment, the rubber is added to the mixer in bale form, that is in pieces having sizes greater than about 20 cm. It is also contemplated that the rubber may be added to the mixer in much smaller pieces, e.g., in pieces below about 10 mm.

Additional materials useful in rubber processing may be added prior to either of the mixing steps referred to above. Such materials include processing aids, antioxidants, antiozonants, etc.

The quality of the rubber/filler powder, and the final masterbatch compound, may be controlled by varying a number of parameters, including the volume loading of the mixer, mixing temperature, mixing time, mixing shear stress, and the blend ratio of the rubber and filler. For further information, see published application WO 00/26279 published May 11, 2000, the contents of which are incorporated herein by reference.

In a preferred embodiment, the process of the present invention is capable of eliminating a mixing step in the preparation of a rubber stock. The stock may be prepared at a lower mixing temperature in a single mixing step. Conventional techniques mix the rubber and filler at a relatively high temperature, thus precluding the addition of curatives, because the high processing temperature would activate the curatives and pre-cure the rubber. The curatives are normally mixed into the stock either on a mill or in a mixer as a second step after the stock has cooled. In a preferred embodiment of the present invention, because the rubber and filler are subjected to lower temperatures during mixing, it is possible to add the curatives during the initial mixing step to form the powder, or the curative(s) may be added to the rubber/filler powder with the plasticizer and then mixed, without having to first remove the rubber/filler powder from the mixer, or having to let it cool. Moreover, those aspects of the present invention reduce or eliminate the need for the use of prevulcanization inhibitors.

The following non-limiting examples are illustrative of the processes and products of the present invention.

In all of the following examples, the following generic membrane compound was used:

|  | PHR | GRAMS |
| --- | --- | --- |
| 1 Royalene 3275 (Uniroyal Chemical Co.) | 100.00 | 68.00 |
| 2 N-650 carbon black (Cabot Corp) | 125.00 | 85.00 |
| 3 Sunpar 2280 (Sun Refining) | 95.00 | 64.60 |
| 4 Kadox 911C (Zinc Corp. of America) | 5.00 | 3.40 |
| 5 Stearic Acid | 1.00 | .68 |
| 6 Delac NS (Uniroyal Chemical Co.) | 2.00 | 1.36 |
| 7 Tuex (Uniroyal Chemical Co.) | .50 | .34 |
| 8 Ethyl Tuex (Uniroyal Chemical Co.) | .50 | .34 |
| 9 Sulfur | .70 | .48 |
| Total |  | 224.20 |

Mixing Procedure I

Samples were mixed in a 420 ml Brabender Prep Center with cam style mixing rotors. Rotor speed was set at 50 rpm and the unit was set at 65° C. with room temperature air for cooling. Batch sizes were held constant at 224.2 grams. All mixed stocks were sheeted out on a 130° F. laboratory mill after 5 passes.

EXAMPLE 1

Royalene 3275 and N-650 carbon black were mixed for 2.5 minutes which resulted in a torque of near zero and a batch temperature of 74° C. to form a powdery mixture. The curative package (4-9) and the extender oil (3) were then added and the mixing continued for an additional 2 minutes. At the end of this step the torque was 850 M-GM with a temperature of 93° C.

EXAMPLE 2

This is similar to Example 1 except that the curative package (4-9) and extender oil (3) were mixed for a total of 4 minutes to form a powdery mixture. After the first 2.5 minutes the torque was near zero and the temperature was 73° C. After the other ingredients were mixed the torque was 750 MGM with a temperature of 100° C.

EXAMPLE 3

In this example, ingredients (1–2 and 4–9) were added to the mixer, and mixed for 2 minutes to form a powdery mixture. At the end of the first mixing step, the torque was near zero and the temperature was 73° C. The extender oil (3) was added and mixing continued for 2 minutes. At the end of the second mixing step the torque was 850 M-GM and the temperature was 95° C.

EXAMPLE 4

This is similar to Example 3 except that after the extender oil addition the mixing was continued for 4 minutes. After the first two minutes of mixing a powdery mixture product was formed. It had a torque of near zero and a temperature of 72° C. After the additional 4 minutes of mixing the torque was 750 M-GM with a temperature of 101° C.

EXAMPLE 5

This example is a control describing a two step process. Items (1–5) were added to the mixer and were mixed for 2 minutes, resulting in a torque of 900 M-GM and a temperature of 96° C. The stock was removed from the mixer and cooled to 23° C. The stock and curatives (6–9) were placed back in the mixer and mixed for 2 minutes, resulting in a torque of 775 MG-GM and a temperature of 95° C.

EXAMPLE 6

This is also a control describing a two step process. It is similar to Example 5 except the first mix was done for 4 minutes, resulting in a torque of 750 M-GM with a temperature of 103° C. The stock was removed from the mixer and cooled to 23° C. The stock and curatives (6–9) were placed back in the mixer and mixed for 4 minutes, resulting in a torque of 225 M-GM and a temperature of 94° C.

Cured Compound Test Results

The Dispersion Index was measured on each stock using a Federal Products Dispersion Analyzer, which measures how well the carbon black is dispersed within the stock (See Table 1).

These data show that the stocks made via the process of the present invention (Examples 1–4) have the same carbon black dispersion as the two controls (Examples 5–6).

The 6 stocks were cured for 30 minutes at 160° C. in an ASTM mold and tested for physical properties. The stress-strain data below in Table 1 show no differences between the controls and those stocks prepared in accordance with the present invention.

TABLE 1

| Example | Tensile, psi (Mpa) | S-300, psi (Mpa) | Elongation, % | Hardness | Dispersion Index (%) |
|---|---|---|---|---|---|
| 1 | 1660 (11.4) | 750 (5.2) | 760 | 58 | 98.9 |
| 2 | 1682 (11.6) | 798 (5.5) | 735 | 59 | 98.8 |
| 3 | 1613 (11.1) | 726 (5.0) | 766 | 60 | 98.4 |
| 4 | 1617 (11.1) | 767 (5.3) | 743 | 60 | 98.8 |
| 5 | 1649 (11.4) | 778 (5.4) | 742 | 61 | 98.8 |
| 6 | 1613 (11.1) | 757 (5.2) | 732 | 61 | 98.9 |

EXAMPLE 7

In a typical tire tread recipe, SBR 1500; SBR-1502; cis-Polybutadiene, Cisdene 1203; and Carbon Black N-339 were mixed in the same Brabender Prep Center used in Examples 1–6, described as Mixing Procedure I. After 1.5 minutes of mixing when the polymers and the carbon black converted into a powder form, the mixer was stopped. The "curative package" (see complete recipe in Table 2 below) and the plasticizer, Sundex 790, were added and the mixing was continued for an additional 2.0 minutes, for a total of 3.5 minutes. The stock was sheeted out after five passes through a mill, and then cured for 10 minutes at 177° C. in a 15.2 cm×15.2 cm×0.19 cm mold. Specimens were removed from this slab and tested for physical properties. The results are shown in Table 3.

EXAMPLE 8

The ingredients and mixing procedure are the same as in Example 7 except that after the "curative package" and extender oil are added, the mixing was continued for 4 minutes for a total mixing time of 5.5 minutes. The results are also shown in Table 3.

The mixing time of 2 minutes after the addition of the "curative package" and the plasticizer give good physical properties, and the mixing for 4 minutes produces products with excellent properties and improved dispersion index.

TABLE 2

Typical Tire Tread Recipe Used for Examples 7 and 8

|  | Grams | PHR |
|---|---|---|
| 1. SBR-1502 (Ameripol Synpol) | 40.0 | 60 |
| 2. SBR-1500 (Ameripol Synpol) | 13.4 | 20 |
| 3. Cisdene 1203 (American Synthetic Rubber) | 13.4 | 20 |
| 4. Carbon Black, N-339 (Continental Carbon) | 56.8 | 85 |
| "Curative Package" |  |  |
| 5. Zinc Oxide | 2.0 | 3.0 |
| 6. Stearic Acid | 0.67 | 1.0 |
| 7. Flexzone 7P (Uniroyal Chemical Co.) | 0.67 | 1.0 |
| 8. Sunproof Wax Jr. (Uniroyal Chemical Co.) | 0.33 | 0.5 |
| 9. Delac NS (Uniroyal Chemical Co.) | 0.84 | 1.25 |
| 10. Tire Sulfur | 1.17 | 1.75 |
| "Plasticizer" |  |  |
| 11. Plasticizer, Sundex 790 (Sun Refining) | 33.2 | 50 |
| Total | 162.48 |  |

TABLE 3

Physical Properties From Examples 7 and 8

|  | Example | |
|---|---|---|
|  | 7 | 8 |
| Total Mixing Time, min. | 3.5 | 5.5 |
| Tensile Strength, Mpa (psi) | 14.4 (2088) | 15.4 (2233) |
| Modulus 300%, Mpa (psi) | 6.4 (928) | 7.1 (1030) |
| Elongation, % | 640 | 630 |
| Hardness, Shore A | 65 | 62 |
| Dispersion Index | 76.3 | 86.6 |

Mixing Procedure II

Samples were mixed in a 1,600 ml B-Banbury type of internal mixer. Rotor speed was set at 100 rpm and the unit was set at the initial temperature of 65° C., for Examples 9 and 10, and at 18° C. for Example 11. Batch size was the same for Examples 9 and 10, but was higher for Example 11, as shown in Table 4. In Examples 9, 10, and 11, the same generic recipe for tire tread was used as in Examples 7 and 8. See Table 2.

EXAMPLE 9

The three rubbers and the carbon black, a total of 844 grams, were mixed for 2 minutes, when the polymers and the carbon black converted into a powder form. The "curative package" and the plasticizer, same recipe as shown in Table I, were added after the mixer was stopped, and the mixing was continued for an additional 3.5 minutes, for a total of 5.5 minutes mixing time. The stock was sheeted out after five passes through a mill, and then it was cured for 10 minutes at 177° C. in a 15.2 cm×15.2 cm×0.19 cm mold. Specimens were removed from this slab and tested for physical properties. The results are shown in Table 4.

EXAMPLE 10

In this example, the "curative package" was added at the beginning of the mixing cycle, along with the rubbers and the carbon black. The plasticizer was added after the first 2 minutes of the first mixing cycle. Again, the total mixing cycle was 5.5 minutes. The physical properties of this compound are shown in Table 4.

EXAMPLE 11

In this example, the total amounts of the ingredients were increased, in order to demonstrate the more efficient utilization of the mixer. The amount of the rubbers and the carbon black was 940 grams, while for Examples 9 and 10 it was only 844 grams. The mixing cycles and order of additions of the ingredients were the same as in Example 9. However, the starting temperature of the mixer in this case was only 18° C. vs 65° C. in Example 9. The physical properties of this compound are shown in Table 4.

TABLE 4

Physical Properties for Examples 9, 10, and 11

|  | Examples | | |
|---|---|---|---|
|  | 9 | 10 | 11 |
| Initial Volume Loading of the Mixer, % | 45 | 45 | 50 |
| Total Mixing Time, min. | 5.5 | 5.5 | 5.5 |
| Total weight of Initial Ingredients (g) | 844 | 844 | 940 |
| Total Weight of Plasticizer and Curatives | 265.4 | 265.4 | 296.4 |
| Initial Temperature of Mixer (° C.) | 65 | 65 | 18 |
| Vulcanized at 160° C. for 15 minutes | | | |
| Modulus 300%, Mpa (psi) | 5.3 (770) | 6.4 (925) | 5.6 (835) |
| Tensile Strength, Mpa (psi) | 15.9 (2300) | 15.4 (2230) | 15.6 (2255) |
| Elongation, % | 740 | 660 | 710 |
| Hardness, Shore A | 53 | 59 | 55 |
| Dispersion Index | 99.4 | 99.2 | 99.4 |

These examples demonstrated the invention of a single stage mixing in:
(a) larger mixing unit, B-Banbury, Examples 9, 10, and 11;
(b) the "curative package" can be incorporated during the formation of the powder rubber-carbon black mixture or later on with the plasticizer, Example 10 vs Example 9; and
(c) the % loading of the internal mixer can be increased by controlling the initial temperature of the mixer, Example 11.

The invention claimed is:

1. A method for the formation of a solid non-powdery rubber/filler compacted masterbatch compound, which method comprises a) introducing into a mixing vessel a rubber, a filler and optionally a curative; b) intimately mixing said rubber, filler and optional curative for a time and under shear conditions sufficient to convert the components into a free flowing associated composition of rubber, filler and optional curative; c) adding a plasticizer and optionally a curative to said associated composition in said mixing vessel; and d) mixing said plasticizer, optional curative and said associated composition for a time sufficient to form a solid non-powdery compacted masterbatch compound; wherein a curative is added during at least one of steps a) and c).

2. The method of claim 1, wherein the rubber is selected from the group consisting of natural rubber and synthetic rubbers.

3. The method of claim 2, wherein the rubber is natural rubber.

4. The method of claim 2, wherein the synthetic rubber is selected from the group consisting of ethylene-propylene-diene terpolymer (EPDM) rubber, ethylene-propylene rubber (EPR), styrene/butadiene rubber, acrylonitrile/butadiene rubber, polychloroprene, polybutadiene rubber, isobutylene-isoprene copolymer, and mixtures thereof.

5. The method of claim 4, wherein the rubber is an EPDM rubber.

6. The method of claim 4, wherein the rubber is an acrylonitrile/butadiene rubber.

7. The method of claim 4, wherein the rubber is a styrene-butadiene rubber.

8. The method of claim 4, wherein the rubber is a polybutadiene rubber.

9. The method of claim 1, wherein the filler is selected from the group consisting of carbon black, hydrated amorphous silica, fumed silica, diatomaceous earth, talc, calcium carbonate, and mixtures thereof.

10. The method of claim 9, wherein the filler is carbon black.

11. The method of claim 1, wherein the plasticizer is a paraffinic, aromatic, or naphthenic extender oil; a monomeric phthalate, adipate or sebacate; a polyester adipate or sebacate oil; or mixtures thereof.

12. The method of claim 1, wherein the weight ratio of rubber to filler is from about 1:0.15 to about 1:10.

13. The method of claim 12, wherein the weight ratio of rubber to filler is from about 1:0.15 to about 1:1.5.

14. The method of claim 1, wherein the rubber is substantially free of filler prior to step b) and wherein the rubber is in a substantially dry state prior to step b).

15. The method of claim 1, wherein the rubber comprises a mixture of at least two different rubbers.

16. The method of claim 1, wherein the filler comprises a mixture of at least two different fillers.

17. The method of claim 1, wherein the curative is selected from the group consisting of N-cyclohexyl-2-benzothiazole sulfonamide; N-t-butyl-2-benzothiazole sulfenamide; 2-(morpholinothio)benzothiazole; 2-mercaptobenzothiazole; tetraethylthiuram disulfide; tetramethyithiuram monosulfide; tetramethyithiuram disulfide; zinc dimethyldithio carbamate; diphenyl guanidine; sulfur; insoluble sulfur; 4,4' dithiodimorpholine; dipentamethylene thiuram tetrasulfide; dicumyl peroxide; 2,2'-bis(tert-butylperoxy)di-isopropyl benzene; p-quinone dioxime, and combinations thereof.

18. The method of claim 1, wherein the rubber introduced into the mixing vessel has an average particle size of less than 10 mm.

19. The method of claim 1, wherein the plasticizer is present in an amount of from about 10 to about 160 parts per hundred parts of rubber.

20. The method of claim 1, wherein the rubber of step a) is in bale form.

21. The method of claim 20, wherein the rubber of step a) has a minimum particle size of at least 20 cm.

22. A method for the formation of a solid non-powdery rubber/filler compacted masterbatch compound, which method comprises a) introducing into a mixing vessel i) a free flowing associated composition of a rubber, a filler and optionally a curative; and ii), a plasticizer and optionally a curative, wherein a curative is added to the vessel in this step; and b) mixing said plasticizer, curative and said associated composition for a time sufficient to form a solid non-powdery compacted masterbatch compound.

23. The method of claim 22, wherein the rubber is selected from the group consisting of natural rubber and synthetic rubbers.

24. The method of claim 7, wherein the rubber is natural rubber.

25. The method of claim 23, wherein the synthetic rubber is selected from the group consisting of EPDM rubber, EPR rubber, styrene/butadiene rubber, acrylonitrile/butadiene rubber, polychloroprene, polybutadiene rubber, isobutylene-isoprene copolymer, and mixtures thereof.

26. The method of claim 25, wherein the rubber is an EPDM rubber.

27. The method of claim 25, wherein the rubber is an acrylonitrile/butadiene rubber.

28. The method of claim 25, wherein the rubber is a styrene-butadiene rubber.

29. The method of claim 25, wherein the rubber is a polybutadiene rubber.

30. The method of claim 22, wherein the filler is selected from the group consisting of carbon black, hydrated amorphous silica, fumed silica, diatomaceous earth, talc, calcium carbonate, and mixtures thereof.

31. The method of claim 30, wherein the filler is carbon black.

32. The method of claim 22, wherein the plasticizer is a paraffinic, aromatic, or naphthenic extender oil; a monomeric phthalate, adipate or sebacate; a polyester adipate or sebacate oil; or mixtures thereof.

33. The method of claim 22, wherein the weight ratio of rubber to filler is from about 1:0.15 to about 1:10.

34. The method of claim 33, wherein the weight ratio of rubber to filler is from about 1:0.15 to about 1:1.5.

35. The method of claim 22, wherein the rubber comprises a mixture of at least two different rubbers.

36. The method of claim 22, wherein the filler comprises a mixture of at least two different fillers.

37. The method of claim 22, wherein the curative is selected from the group consisting of N-cyclohexyl-2-benzothiazole sulfenamide; N-t-butyl-2-benzothiazole sulfenamide; 2-(morpholinothio)benzothiazole; 2-mercaptobenzothiazole; tetraethylthiuram disulfide; tetramethylthiuram monosulfide; tetramethyithiuram disulfide; zinc dimethyldithio carbamate; diphenyl guanidine; sulfur; insoluble sulfur; 4,4' dithiodimorpholine; dipentamethylene thiuram tetrasulfide; dicumyl peroxide; 2,2'-bis(tert-butylperoxy)diisopropyl benzene; p-quinone dioxime, and combination thereof.

38. The method of claim 22, wherein the plasticizer is present in an amount of from about 10 to about 160 parts per hundred parts of rubber.

39. The method of claim 22, wherein the rubber of step a) has a maximum particle size of about 10 mm.

* * * * *